United States Patent [19]

Hudson

[11] Patent Number: 4,465,268
[45] Date of Patent: Aug. 14, 1984

[54] VEE BLOCK

[75] Inventor: Charles S. Hudson, Birmingham, England

[73] Assignee: Atopsy Limited, Birmingham, England

[21] Appl. No.: 394,854

[22] Filed: Jul. 2, 1982

[30] Foreign Application Priority Data

Jul. 17, 1981 [GB] United Kingdom ............... 8122204

[51] Int. Cl.³ ............................................. B25B 11/02
[52] U.S. Cl. ..................................... 269/99; 269/296; 269/902
[58] Field of Search ............... 269/900, 902, 296, 101, 269/99; 51/217 R; 33/174 S, 174 H, 174 R; 211/60 T, 60 R

[56] References Cited

U.S. PATENT DOCUMENTS

| | | | |
|---|---|---|---|
| 2,364,150 | 12/1944 | Lowenstein | 269/902 |
| 2,932,995 | 4/1960 | Durfee | 269/902 |
| 3,088,728 | 5/1963 | Sanborn | 269/296 |
| 3,207,504 | 9/1965 | Kelley et al. | 269/296 |
| 3,218,059 | 11/1965 | Andrew | 269/902 |
| 3,592,460 | 7/1971 | Lower | 269/101 |
| 4,079,927 | 3/1978 | Roctor | 269/296 |
| 4,310,094 | 1/1982 | Hotchkiss | 211/60 |

Primary Examiner—Robert C. Watson
Attorney, Agent, or Firm—C. O. Marshall, Jr.

[57] ABSTRACT

The invention combines a Vee block and angle plate, as used for example by tool makers, into a single article. As shown in FIG. 1, for example, it is possible to maintain much of the versatility of a typical angle plate with that of a typical Vee block, but at greatly reduced cost as compared to that of providing the two separate parts.

3 Claims, 2 Drawing Figures

VEE BLOCK

DESCRIPTION

This invention relates to precision vee blocks as used in (primarily) metal machining to support (usually) cylindrical objects in parallel relation e.g. to the bed or like of a machine tool, and enabling the objects to be clamped in such position for marking out, machining and the like.

The invention also relates to angle plates which comprises a pair of surfaces at a precise angle to one another (usually a right angle) and each of which is provided with slots, keyways or the like by means of which one of the surfaces may be clamped e.g. to the bed of the machine tool whilst the other is used to support an object, which can be clamped thereto, so that the object can be fixed in any precise spatial relation for the purpose of marking out, machining and the like.

It will be appreciated that in both cases, the Vee block and the angle plate, the marking out operation may take place on a precision flat plate which is separate from the machine tool. In both cases the kinds of machine tools which are involved include milling, planing, drilling, boring and like machine tools.

Vee blocks and angle plates are in widespread use in manufacturing industry, and have been so for very many years. Although each Vee block or angle plate merely comprises an iron or steel casting machined on the relevant faces and usually with machined slots, keyways and the like, they are extremely expensive because of the precision involved in their manufacture.

The object of the invention is to provide improvements.

In accordance with a broad aspect of the invention, an angle plate and a Vee block are combined in a single article. By these means, the cost, as compared with that of providing a separate Vee block and angle plate, can be considerably reduced.

Two embodiments of the invention are now described by way of example and with reference to the accompanying drawings.

Figure 1:
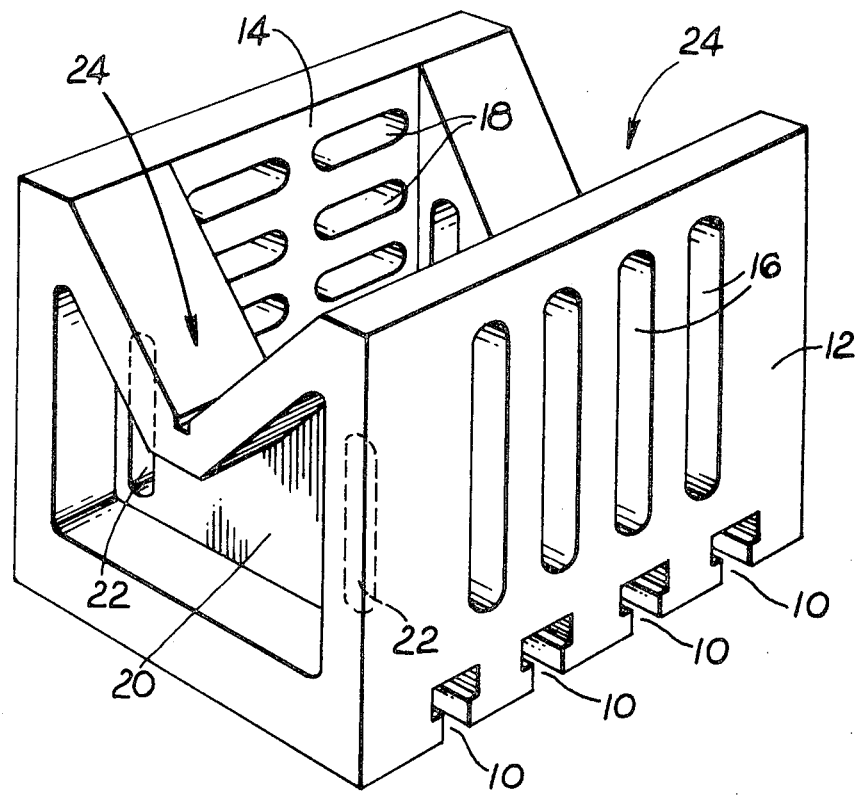
FIG. 1 is a perspective view of the first embodiment of the vee blocks.

Referring firstly to FIG. 1, which is a perspective view of a first embodiment, the block comprises a base provided with (in this example) four parallel Tee slots 10 by means of which it may be clamped to the bed of a machine tool. The longer parallel and vertical faces 12, 14 are each pierced with patterns of slots. One of these walls (in the illustration) has four parallel and vertically extending slots 16, and the opposite side face has pairs of co-axial horizontally extending slots 18.

Each of the end faces is recessed at 20 and is provided with a further pair of vertically extending slots 22.

The top face of the block is provided with a pair of Vee-shaped recesses 24 and the surfaces of these recesses are co-planar.

The actual number of slots and their distribution and whether they are through slots such as those in the side and end walls or Tee slots into the thickness of the base is quite immaterial. A particular pattern may be preferred in a particular kind of work and a different pattern in another kind of work. The purpose of all of the slots in the side walls and end walls is to facilitate the attachment of clamp means for securing the workpiece to the Vee block or to one or other of the side or end walls and/or of securing the block to a machine tool according to the nature of the work in hand.

Figure 2:
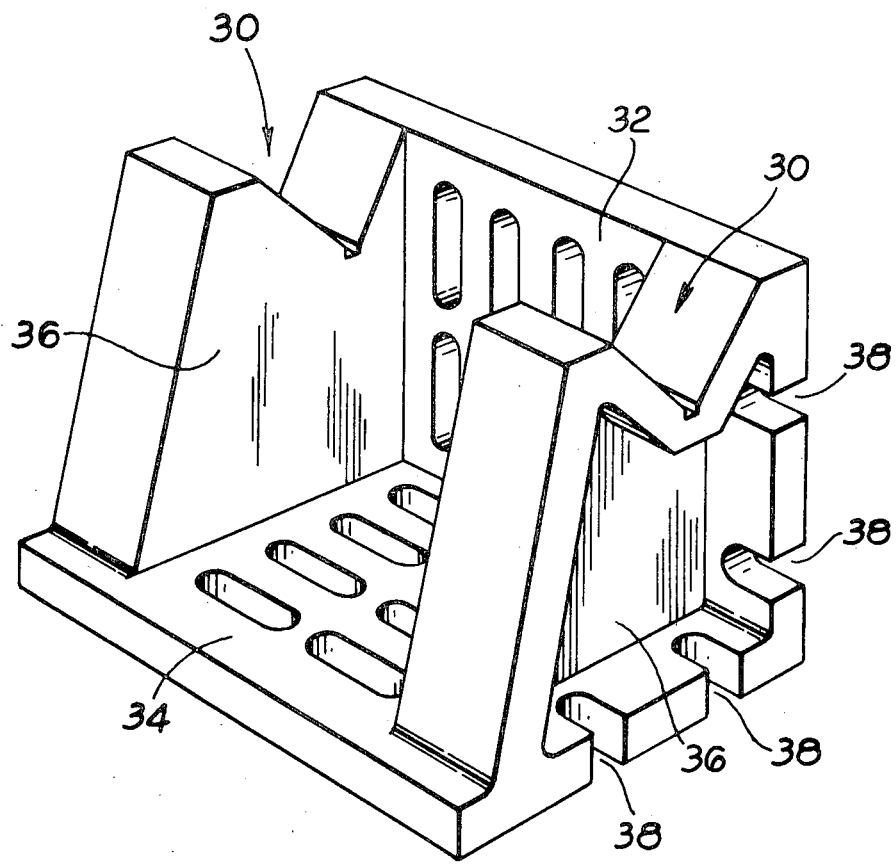
FIG. 2 is a perspective view of the second embodiment of the vee blocks.

FIG. 2 shows another embodiment. Again the top is provided with a pair of Vee recesses 30 which have co-planar surfaces. In this case one side wall 32 and the base 34 are through-slotted, and instead of providing two side walls and two end walls all of which are mutually at right angles to one another and to the base, only a single side wall and two end walls 36 are provided in such manner. The open side lying between the two Vee block parts facilitates ingress to the base slots and to a portion of the workpiece lying between the Vee blocks, where they are used.

In this case also, the side wall and base have half slots 38 opening to the end face, and these may be provided at each end, and may similarly be used to receive trapping bolts to fix the block/plate to a bed and/or to fix a workpiece to the plate. This illustrates that it is not essential to use complete slots carrying both ends bounded by the material of the block.

In the case of either the known Vee block or angle plate it is necessary to machine all faces true, flat, and at a precise angle to the next face, since any one face may rest on the machine bed (etc) and all must be true. Although all of the faces of the illustrated blocks are (desirably) ground, by combining the two in one, a reduction of near 50% in the number of faces to be machined (usually ground) is achieved for a given set of results.

I claim:

1. A work holding device for use in marking out, machining and the like, comprising a one-piece unitary hollow box-like steel casting having
    (a) a flat rectangular base,
    (b) two parallel end walls extending perpendicular to the base along two opposite edges of the base, the edges of such end walls remote from the base having aligned symmetrical Vee recesses but being otherwise parallel to the base,
    (c) at least one side wall extending perpendicular to the base along another edge of the base, and
    (d) slots formed in the base, in at least one end wall and in at least one side wall for the attachment of clamp means thereto.

2. A device as claimed in claim 1 which is rectangular in plan view having a pair of side walls and a pair of end walls, all of these walls being formed with slots therethrough, and the base being formed with Tee-section slots.

3. A device as claimed in claim 1 wherein only a single wall is provided in addition to said two parallel walls so that, between said parallel walls, the device is substantially L-shaped in cross-section affording access to the interior of the box.

* * * * *